April 12, 1966 R. RICHHEIMER 3,245,675
STAINING RACKS
Filed Dec. 26, 1961
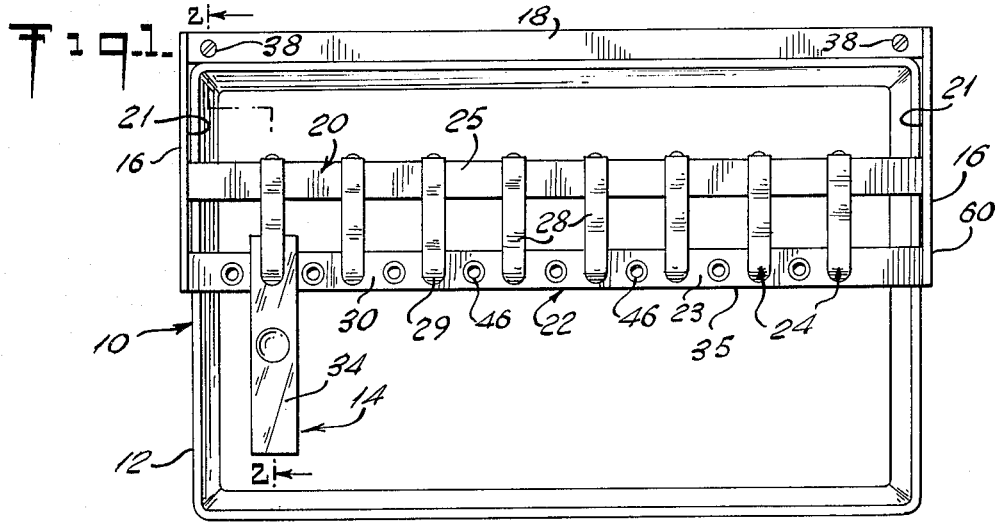
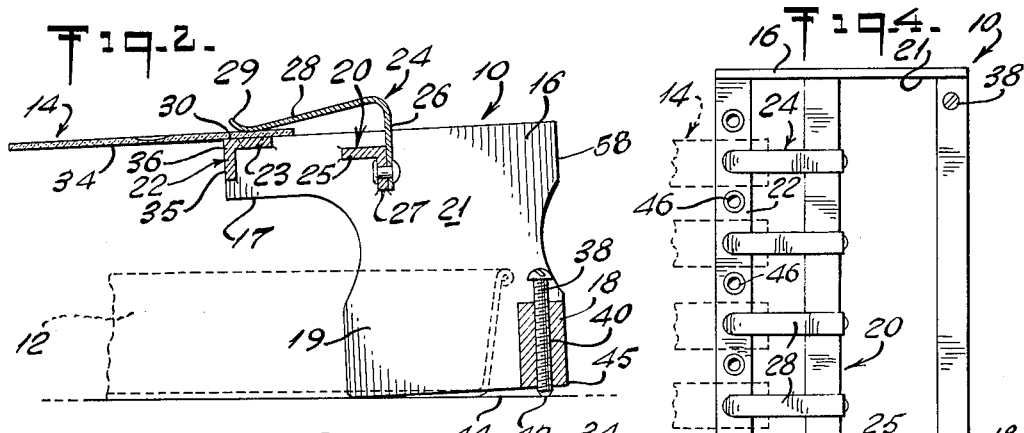
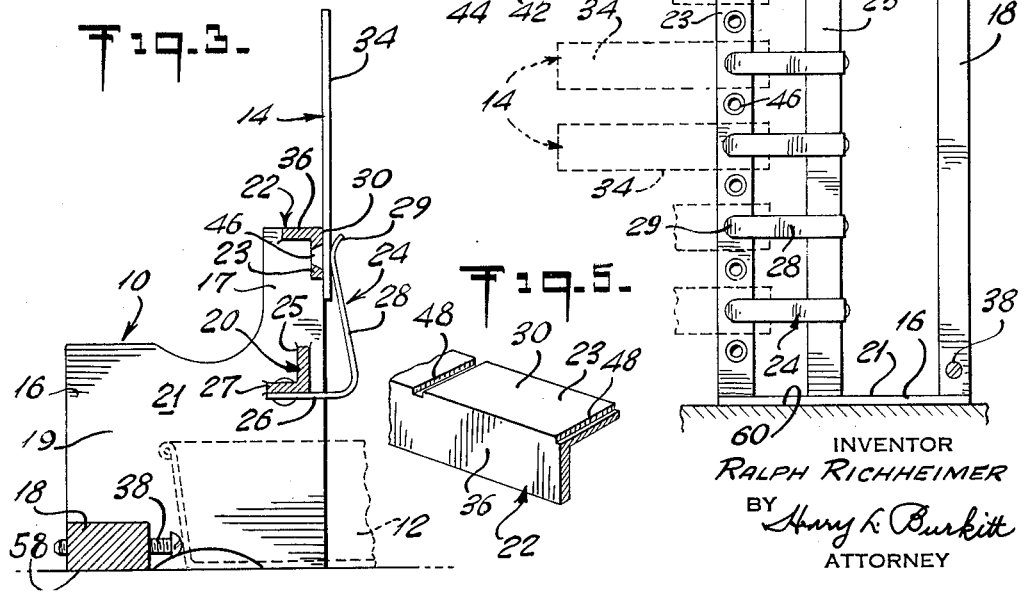
INVENTOR
RALPH RICHHEIMER
BY
Harry L. Burkitt
ATTORNEY

United States Patent Office 3,245,675
Patented Apr. 12, 1966

3,245,675
STAINING RACKS
Ralph Richheimer, 45—10 Kissena Blvd., Flushing, N.Y.
Filed Dec. 26, 1961, Ser. No. 161,845
13 Claims. (Cl. 269—154)

This invention relates to staining racks.

The steps of preparing staining slides in the laboratory in various investigations there performed are very time consuming, even when the procedure is routinized. The cost of handling single slides obviously is great by reason of the labor time involved; the chances of error are great.

It is an object of the invention to provide a staining rack or tray for removable association therewith of slides for disposition, as a group, in different positions for different purposes, and at different times, to facilitate the operations of the technician during various laboratory operations.

It is an object of the invention to provide a staining rack or tray which receives and retains slides so that when the fluids are applied to the individual slides, any material which may overflow will be caught easily in a drip pan or in a basin, without affecting the efficiency of the staining operation, or the subsequent steps in which the slides are disposed in other positions for effecting other results such as drying, inspection, and the like.

It is an object of the invention to provide a simple but sturdy arrangement by which a plurality of slides may be associated readily and easily, in side by side relationship, for application of the fluids to the slides individually, without danger that the fluids may flow from slide to slide, and destroy the ability properly to evaluate the individual specimens applied to the separate slides.

It is an object of the invention to provide a structure in which limited adjustability is attained for the angle at which the slides may be disposed in order that material applied to the individual slides may tend to flow in a given direction, which preferably is away from the areas where the individual slides are held upon the rack so that any excess of the applied material may tend to drip off the slides at the ends where such dripping material cannot interfere with the various manipulations by the technician.

It is an object of the invention to provide a staining rack of the type indicated which is constructed so that a receptacle such as a pan may be located beneath the slides in position so that overflow material may drip into it, without interfering with the flexibility of the entire arrangement, or with the removal or replacement of slides at will.

It is an object of the invention to provide a staining rack constructed for disposition in at least three effective positions, whereby the slides may have their processed faces disposed in a substantially horizontal position, and also in at least two vertical positions.

Other objects of the invention will be set forth hereinafter, or will be apparent from the description and the drawings, in which are illustrated embodiments exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the statutes for disclosure of an operative embodiment, but not to show all the various forms and modifications in which the invention might be embodied.

On the drawings, in which the same reference characters refer to the same parts throughout, and in which are disclosed such practical constructions, FIG. 1 is a plan view of a staining rack embodying features of the invention, a pan being shown in the position it may assume, nested with the rack, and beneath the slides, and one of the slides being shown in place;

FIG. 2 is a detail vertical cross-sectional view, substantially on the line 2—2 of FIG. 1, part of the pan being shown by dotted lines, the other part of the pan being broken away;

FIG. 3 is a view similar to FIG. 2, the rack being shown adjusted to a different position, and the pan now being shown in a new association with the rack for the reception of any drainage from the slides;

FIG. 4 is a vertical elevational view of the rack, showing its disposition in another position, some slides, shown in dotted lines, being illustrated in full, and others being broken away, being disposed with their faces substantially vertical; and FIG. 5 is a detail perspective view of a portion of the rack, illustrating a modified form it may take to facilitate draining.

On the drawings is illustrated a staining rack 10, shown associated with a drain pan 12. In the illustration, slides 14 are retained by the rack and extend over pan 12, as described further.

Rack 10 may comprise a pair of end walls 16 which may be substantially identical in shaping, cut from sheet metal, as, for instance, sheet aluminum. The shaping found suitable for each wall 16 is an inverted L-form, the horizontal leg 17 extending clear of the vertical leg 19. Extending between the inside faces 21 of end walls 16 may be a metallic bar 18 and a pair of metallic angles 20 and 22. For chemical purposes, and for ease in cleaning, bar 18 and angles 20 and 22 may also be of aluminum, or some simple cheap material which is relatively inactive chemically. Bar 18 and angles 20 and 22 may be secured to faces 21 by any suitable means; for instance, a form of brazing or soldering may be used to secure the parts together. Bar 18 may be located at the lower portion of walls 16, substantially at the rear corner, relatively to rigidify the structure at that position. Angle 22 may be disposed at the upper corner of, and at substantially the most advanced position on, leg 17. Angle 20 is spaced rearwardly and slightly downwardly from angle 22. As shown, a leg 23 of angle 22 and a leg 25 of angle 20 are disposed substantially horizontally in the position shown in FIG. 2, with leg 25 below leg 23.

A plurality of leaf springs 24 are secured in any suitable manner, as, for instance, by rivetting or some other desired method, to angle 20. The springs comprise a leg 26 which is secured against the substantially vertical leg 27 of angle 20. The spring then extends upwardly, and then is bent to extend forwardly into a prong 28 which terminates in a free, slightly bent end 29 which is positioned to rest upon face 30 of leg 23. Slides 14, which may be of glass or other suitable material, are intended to be inserted between end 29 and face 30. In that association, the resilience of engagement of spring 24, pressing the slide against face 30, will serve to retain the slide firmly, yet releasably, in position. In that association, the greatest portion 34 of the slide extends forwardly and free of the outermost boundary of the staining rack, which is the outside face 35 of leg 36.

Walls 16 are spaced from each other, and bar 18 and angles 20 and 22 are positioned so that pan 12, as shown in FIG. 2, is positionable beneath both angles 20 and 22, and substantially in abutment with bar 18. Pan 12 may be dimensioned to extend, in that position, so that slides 14, when retained by springs 24, are positioned for their entire extent over the pan.

Suitable adjusting means may be provided in bar 18, to control the angle to the horizontal of the slides, when the rack is in the position of FIG. 2. For this purpose, a screw 38 may be received in a threaded aperture 40 extending vertically through bar 18. Thus, properly formed end 42 of screw 38 may rest upon surface 44 when edges 45 of walls 16 normally rest on such surface. Manipulation of screw 38 will thus serve to tilt walls 16 and the slides to change the angularity of the slides with relation to surface 44.

Between the positions of engagement of immediately adjacent springs 24 with face 30, and spaced from the areas of engagement, openings 46 may be provided to serve as drains for overflow of liquids. The openings extend through leg 23 so that liquids upon face 30 may pass through these openings, and then drip into pan 12.

In FIG. 5, another drainage means for such structure is shown in the form of grooves 48 which may be cut transversely of face 30 between the engagement areas. Liquids on face 30 will be prevented from passage from spring to spring, and from slide to slide, but will be intercepted by the grooves, and, by reason of the angular disposition of face 30, will flow down face 35 into the pan.

In the use of this apparatus, the first position is that shown in FIG. 2. The rack is rested on surface 44 by means of edges 45 of walls 16. Slides 14 now will extend substantially horizontally in front of face 35, and free of angle 22. Pan 12 is disposed underneath angles 20 and 22, and almost up against bar 18. As shown in FIG. 1, the pan in that relationship is completely under slides 14 so that any drainage from the slides will fall directly into the pan. Walls 16 may also be positioned with front face 35 at or overhanging the very edge of a basin, with edges 45 resting on surface 44 almost at the very edge of the basin. The slides then extend over the basin, and any drainage therefrom will fall into the basin.

When the rack is disposed as shown in FIG. 2, the technician may apply the particular liquid or other material into the slides individually. Any excess then will drip into the pan or into the basin, or it may overflow onto face 30. In such case, drainage openings 46 or grooves 48 will serve to bar movement of fluid from slide to slide, and will serve to drain the fluid instead down to the pan or sink.

After application of the liquids to the slides, and after it has been ascertained that a sufficient quantity is retained upon the slides, the whole rack may then be turned to the position shown in FIG. 3, to rest the rack on edges 58 of walls 16. Now the slides will be disposed substantially vertically. Any drainage from the slides may now move into the pan (shown in dotted lines, FIG. 3) positioned directly beneath the slides for that purpose. While the material upon the slides is drying in this position, the slides are easily inspected.

The rack may then be lifted, and turned, so as to rest on an outer face 60 of one of walls 16. Either of the walls may be utilized for this purpose. In that position, while slides 14 are now substantially horizontal, their faces are substantially vertically disposed so that their faces may be seen and inspected by the technician, while he makes the necessary notes in order to evaluate their disclosures.

It is thus obvious that slides 14, by different dispositions of rack 10, may be caused to assume various positions, and this without removing the slides from the rack. Thus a large number of slides are retained so that, without any manipulation except to turn the rack, the different steps of application of the staining medium, draining and drying of the slides, and finally their inspection, may be performed.

Many other changes could be effected in the particular constructions, and in the methods of use and construction, and in specific details thereof, hereinbefore set forth, without substantially departing from the invention intended to be defined herein, the specific description being merely of embodiments capable of illustrating certain principles of the invention.

What is claimed as new and useful is:

1. A staining rack for releasably retaining substantially rigid specimen slides, the rack comprising a pair of walls, a plurality of elements extending between and retaining the walls in spaced apart relationship, one element having a plurality of spring members secured thereto in spaced apart relationship, the spring members extending from said one element and resting and pressing upon a surface of another element, the spring members and said other element comprising means for clamping and retaining and releasably engaging slides, said slides, when so clamped and retained, extending away from and being otherwise free of said spring members and said other element, the edges of the walls being shaped for resting the rack on a surface in a plurality of positions, certain of the edges providing means for positioning the rack with the faces of the slides in a substantially horizontal plane and other edges providing means for positioning the rack in one of a plurality of substantially vertical planes.

2. A staining rack for releasably retaining substantially rigid specimen slides, the rack comprising a pair of substantially flat plates, a plurality of elements extending between and retaining the plates in spaced apart relationship to form end walls for the rack, one element having a plurality of spring members secured thereto in spaced apart relationship, the spring members extending from said one element and resting and pressing upon a surface of another of the elements, the spring members and said other element comprising means for clamping and retaining and releasably engaging slides, said slides, when so clamped and retained, extending away from and being otherwise free of said spring members and said other element, the edges of the plates being shaped for resting the rack on a surface in a plurality of positions, certain of the edges providing means for positioning the rack with the faces of the slides in a substantially horizontal plane and other edges providing means for positioning the rack in one of a plurality of substantially vertical planes.

3. A staining rack for releasably retaining substantially rigid specimen slides, the rack comprising a pair of substantially flat plates, a plurality of elements extending between and retaining the plates in spaced apart relationship to form end walls for the rack, one element having a plurality of spring members secured thereto in spaced apart relationship, the spring members extending from said one element and resting and pressing upon a surface of another of the elements, the spring members and said other element comprising means for clamping and retaining and releasably engaging slides, said slides, when so clamped and retained, extending away from and being otherwise free of said spring members and said other element, the plates having a plurality of side edges, the rack being positionable to rest on said side edges or on a face of a plate, the rack when positioned either on said edges or on a face providing means for positioning slides with their faces in a substantially horizontal plane or in any one of a plurality of substantially vertical planes.

4. A staining rack for releasably retaining substantially rigid specimen slides, the rack comprising a pair of end walls having a plurality of boundary edges, at least a pair of the boundary edges of one wall being in separate planes substantially perpendicular to each other, a plurality of elements extending between and retaining the walls in spaced apart relationship, the boundary edges of each wall being disposed substantially parallel to the boundary edges of the other wall, one element having a plurality of spring members secured thereto in spaced apart relationship, the spring members extending from said one element and resting and pressing upon a surface of another element, the spring members and said other element comprising means for clamping and retaining and releasably engaging slides, said slides, when so clamped and retained, extending away from and being otherwise free of said spring members and said other element, the boundary edges providing means when the walls are rested on a pair of said boundary edges to dispose the rack with the faces of the slides in a substantially horizontal plane or in a substantially vertical plane.

5. A staining rack for releasably retaining substantially rigid specimen slides, the rack comprising a pair of end walls having a plurality of boundary edges, at least a pair of the boundary edges of one wall being in separate planes substantially perpendicular to each other, a plurality of elements extending between and retaining the walls in spaced apart relationship, the boundary edges of each wall being disposed substantially parallel to the boundary edges of the other wall, one element having a plurality of spring members secured thereto in spaced apart relationship, the spring members extending from said one element and resting and pressing upon a surface of another element, the spring members and said other element comprising means for clamping and retaining and releasably engaging slides, said slides, when so clamped and retained, extending away from the spring member and beyond the bounds of the rack, the boundary edges providing means when the walls are rested on a pair of said boundary edges to dispose the rack with the faces of the slides in a substantially horizontal plane or in a substantially vertical plane.

6. A staining rack for releasably retaining substantially rigid specimen slides, the rack comprising a pair of walls, a plurality of elements extending between and retaining the walls in spaced apart relationship, one element having a plurality of spring members secured thereto in spaced apart relationship, the spring members extending from said one element and resting and pressing upon a surface of another element, the spring members and said other element comprising means for clamping and retaining and releasably engaging slides, said slides, when so clamped and retained, extending away from and being otherwise free of said spring members and said other element, the walls providing means for supporting themselves and the elements when one or more of the walls are rested upon a surface, the walls and the elements being assembled with each other to define a large open area between the walls and the elements for the reception of a receptacle for disposition beneath the clamped slides when the walls are rested upon said surface to dispose the faces of the slides in a substantially horizontal plane.

7. A staining rack for releasably retaining substantially rigid specimen slides, the rack comprising a pair of walls, a plurality of elements extending between and retaining the walls in spaced apart relationship, one element being positioned substantially at the forwardmost portion of the walls and having a substantially planar face, another element having a plurality of spring members secured thereto in spaced apart relationship, the spring members extending from said other element and resiliently engaging against and resting upon said planar face, the spring members and said planar face comprising means for clamping and retaining and releasably engaging slides, said slides, when so clamped and retained, extending away from the spring members and beyond the bounds of the rack, the edges of the walls being shaped for resting the rack on a surface in a plurality of positions, certain of the edges providing means for positioning the rack with the faces of the slides in a substantially horizontal plane and other edges providing means for positioning the rack in one of a plurality of substantially vertical planes.

8. A staining rack comprising a pair of walls, a plurality of elements extending between and retaining the walls in spaced apart relationship, one element having a substantially planar face, another element having a plurality of spring members secured thereto in spaced apart relationship, the spring members extending from said other element and resiliently engaging against and resting upon said planar face, said one element having drainage means provided in said planar face between the positions of engagement of the spring members therewith, the spring members and said planar face comprising means for clamping and retaining and releasably engaging slides, said slides, when so clamped and retained, extending away from the spring members and beyond the bounds of the rack, the edges of the walls being shaped for resting the rack on a surface in a plurality of positions, certain of the edges providing means for positioning the rack with the faces of the slides in a substantially horizontal plane and the other edges providing means for positioning the rack in one of a plurality of substantially vertical planes.

9. A staining rack for releasably retaining substantially rigid specimen slides, the rack comprising a pair of walls, a plurality of elements extending between and retaining the walls in spaced apart relationship, one element having a substantially planar face, another element having a plurality of leaf spring members having flat faces thereof secured to said other element in spaced apart relationship, the spring members extending from said other element and resiliently engaging their flat faces against and resting upon said planar face, the engaging flat faces and said planar face comprising means for clamping and retaining and releasably engaging slides, said slides, when so clamped and retained, extending away from the spring members and beyond the bounds of the rack, the edges of the walls being shaped for resting the rack on a surface in a plurality of positions, certain of the edges providing means for positioning the rack with the faces of the slides in a substantially horizontal plane and other edges providing means for positioning the rack in one of a plurality of substantially vertical planes.

10. A staining rack comprising a pair of walls, a pair of angle members extending between and retaining the walls in spaced apart relationship, a plurality of leaf spring members having flat faces thereof secured in spaced apart relationship to and extending from a leg of one angle member and resting and pressing upon a leg of another angle member, the spring members and the leg of said other angle member comprising means for clamping and retaining and releasably engaging slides, said slides, when so clamped and retained, extending away from the spring members and beyond the bounds of the rack, the edges of the walls being shaped for resting the rack on a surface in a plurality of positions, certain of the edges providing means for positioning the rack with the faces of the slides in a substantially horizontal plane and other edges providing means for positioning the rack in a substantially vertical plane.

11. A staining rack comprising a pair of walls, a pair of angle members extending between substantially the forwardmost and uppermost portions of the walls for retaining the walls in spaced apart relationship, a plurality of leaf spring members having flat faces thereof secured in spaced apart relationship to and extending from a leg of one angle member and resting and pressing upon a leg of another angle member, the spring members and the leg of said other angle member comprising means for clamping and retaining and releasably engaging slides, said slides, when so clamped and retained, extending away from the spring members and beyond the bounds of the rack, the edges of the walls being shaped for resting the rack on a surface in a plurality of positions, certain of the edges providing means for positioning the 12. A staining rack comprising a pair of walls, a pair of angle members extending between substantially the forwardmost and uppermost portions of the walls for retaining the walls in spaced apart relationship, a plurality of leaf spring members having flat faces thereof secured in spaced apart relationship to and extending from a leg of one angle member and resting and pressing upon a leg of another angle member, the spring members and the leg of said other angle member comprising means for clamping and retaining and releasably engaging slides, the slides, when so clamped and retained, extending away from the spring members and beyond the bounds of the rack, the walls providing means for supporting themselves and the angle members when one or more of the walls are rested upon a surface, the walls and the angle members being assembled with each other to define a large open area between the walls and the angle members for the reception of a receptacle for disposition beneath the clamped slides when the walls are rested upon said surface to dispose the faces of the slides in a substantially horizontal plane.

13. A staining rack comprising a pair of walls, a pair of angle members extending between substantially the forwardmost and uppermost portions of the walls, a base member extending between substantially the lowermost and rearmost portions of the walls, the members providing means for retaining the walls in spaced apart relationship, a plurality of leaf spring members having flat faces thereof secured in spaced apart relationship to and extending from a leg of one angle member and resting and pressing upon a leg of another angle member, the spring members and the leg of said other angle member comprising means for clamping and retaining and releasably engaging slides, said slides, when so clamped and retained, extending away from the spring members and beyond the bounds of the rack, the edges of the walls being shaped for resting the rack on a surface in a plurality of positions, certain of the edges providing means for positioning the rack with the faces of the slides in a substantially horizontal plane or in a substantially vertical plane, and means carried by the base member for adjusting the effective angular position of the walls with relation to the surface to vary the effective plane of the faces of the slides when in a substantially horizontal position.

References Cited by the Examiner
UNITED STATES PATENTS

| | | | |
|---|---|---|---|
| 384,526 | 6/1888 | Isbell | 211—50 |
| 384,576 | 6/1888 | Isbell | 211—50 X |
| 1,251,516 | 1/1918 | Hardesty | 269—154 |
| 1,925,202 | 9/1933 | Provost | 211—89 |
| 2,186,432 | 1/1940 | Rosenthal | 95—100 X |
| 2,269,820 | 1/1942 | Jones et al. | 95—100 |

WILLIAM W. DYER, JR., *Primary Examiner.*

THOMAS J. HICKEY, FRANK SUSKO, ROBERT C. RIORDON, *Examiners.*